(12) United States Patent
Kato et al.

(10) Patent No.: US 8,433,173 B2
(45) Date of Patent: Apr. 30, 2013

(54) PORTABLE MEDIA PLAYER SYSTEM

(75) Inventors: Shigeru Kato, Kawasaki (JP); Masaki Otsuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 1463 days.

(21) Appl. No.: 11/921,299

(22) PCT Filed: Sep. 19, 2006

(86) PCT No.: PCT/JP2006/318522
§ 371 (c)(1),
(2), (4) Date: Nov. 29, 2007

(87) PCT Pub. No.: WO2007/037148
PCT Pub. Date: Apr. 5, 2007

(65) Prior Publication Data
US 2009/0048693 A1 Feb. 19, 2009

(30) Foreign Application Priority Data

Sep. 29, 2005 (JP) .................................. 2005-284772
Apr. 7, 2006 (JP) .................................. 2006-106126

(51) Int. Cl.
*H04N 5/775* (2006.01)

(52) U.S. Cl.
USPC ........................................................ 386/230

(58) Field of Classification Search .................. 386/230, 386/231, 232, 362
See application file for complete search history.

(56) References Cited

U.S. PATENT DOCUMENTS

| 7,106,976 | B2 * | 9/2006 | Ide et al. ........................ 398/182 |
| 7,269,673 | B2 * | 9/2007 | Kim et al. ........................ 710/72 |
| 7,565,530 | B2 * | 7/2009 | Kwak et al. ..................... 713/156 |
| 2002/0080091 | A1 * | 6/2002 | Acharya et al. ................. 345/2.1 |
| 2002/0113907 | A1 * | 8/2002 | Endo et al. ..................... 348/730 |
| 2004/0196280 | A1 * | 10/2004 | Yee ................................ 345/418 |
| 2005/0028211 | A1 * | 2/2005 | Mochizuki et al. ............. 725/80 |
| 2005/0066085 | A1 * | 3/2005 | Kobayashi ...................... 710/62 |
| 2006/0017657 | A1 | 1/2006 | Yamasaki |
| 2006/0067690 | A1 * | 3/2006 | Tatum et al. ..................... 398/66 |
| 2006/0239643 | A1 | 10/2006 | Takakuwa et al. |

FOREIGN PATENT DOCUMENTS

| JP | A-05-342824 | 12/1993 |
| JP | A-09-054572 | 2/1997 |
| JP | A-10-133840 | 5/1998 |
| JP | A-2000-338912 | 12/2000 |
| JP | A-2001-8133 | 1/2001 |
| JP | A-2001-238159 | 8/2001 |
| JP | A-2002-350771 | 12/2002 |
| JP | A-2004-236242 | 8/2004 |

(Continued)

OTHER PUBLICATIONS

Feb. 21, 2012 Office Action issued in Japanese Patent Appln. No. 2007-537582 w/translation.

(Continued)

*Primary Examiner* — David Harvey
(74) *Attorney, Agent, or Firm* — Oliff & Berrige, PLC

(57) ABSTRACT

An object is to provide a content reproduction system in which matching of a content reproduction apparatus and a device is performed flexibly and efficiently. For this purpose, the content reproduction system includes a content reproduction apparatus which reproduces a content including at least one of audio and an image, and a device connected to the content reproduction apparatus, in which the content reproduction apparatus is provided with acknowledging unit which acknowledges a driving condition of the device and a controlling unit which operates according to the acknowledged driving condition.

6 Claims, 8 Drawing Sheets

FOREIGN PATENT DOCUMENTS

| | | | |
|---|---|---|---|
| JP | 2005-057714 | * | 3/2005 |
| JP | A-2005-071147 | | 3/2005 |
| JP | A-2006-030802 | | 2/2006 |
| WO | WO 2005/004156 A1 | | 1/2005 |

OTHER PUBLICATIONS

Aug. 21, 2012 Office Action issued in Japanese Patent Application No. 2007-537582 (with translation).

* cited by examiner

[Fig.1]
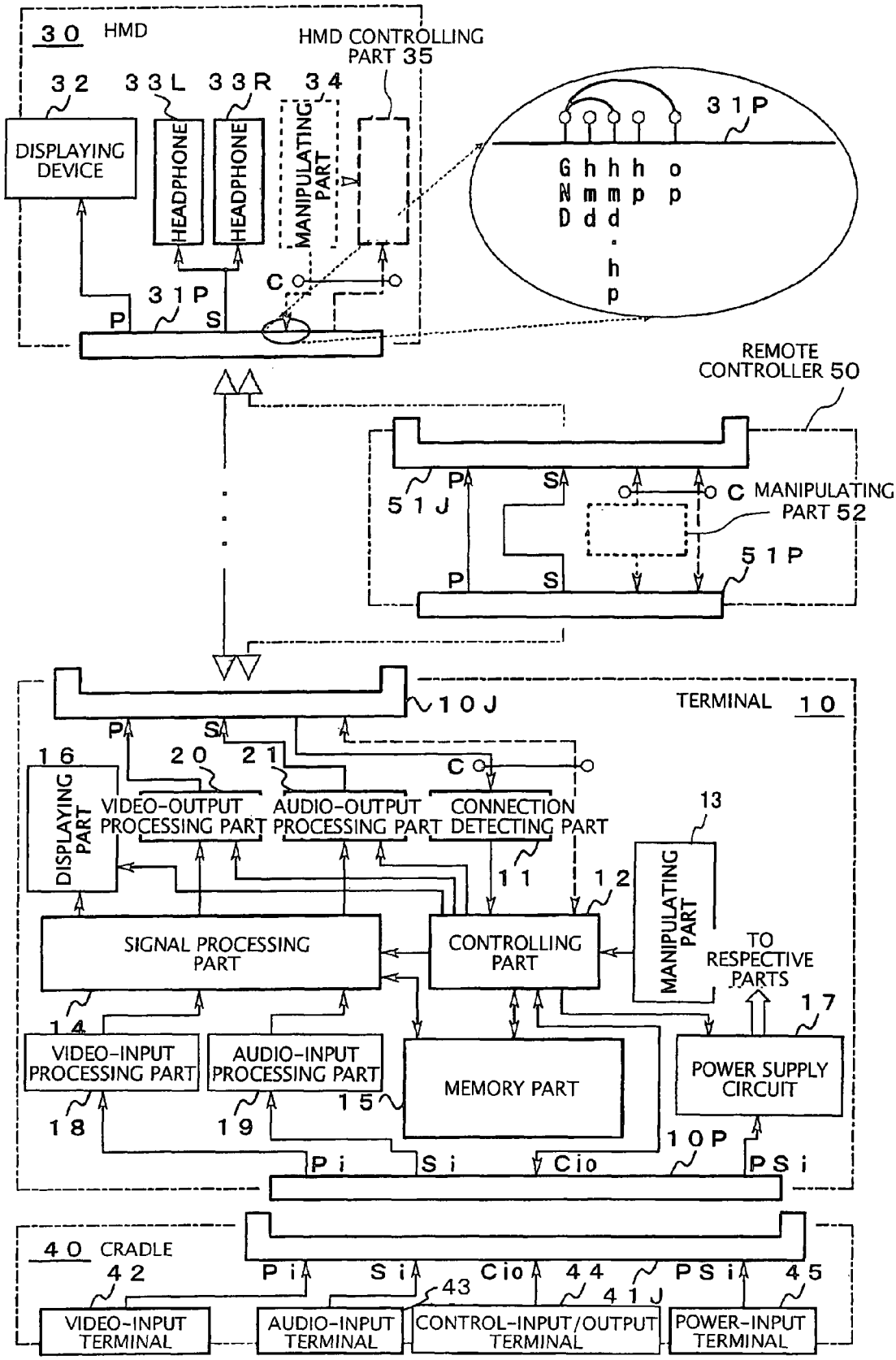

[Fig.2]
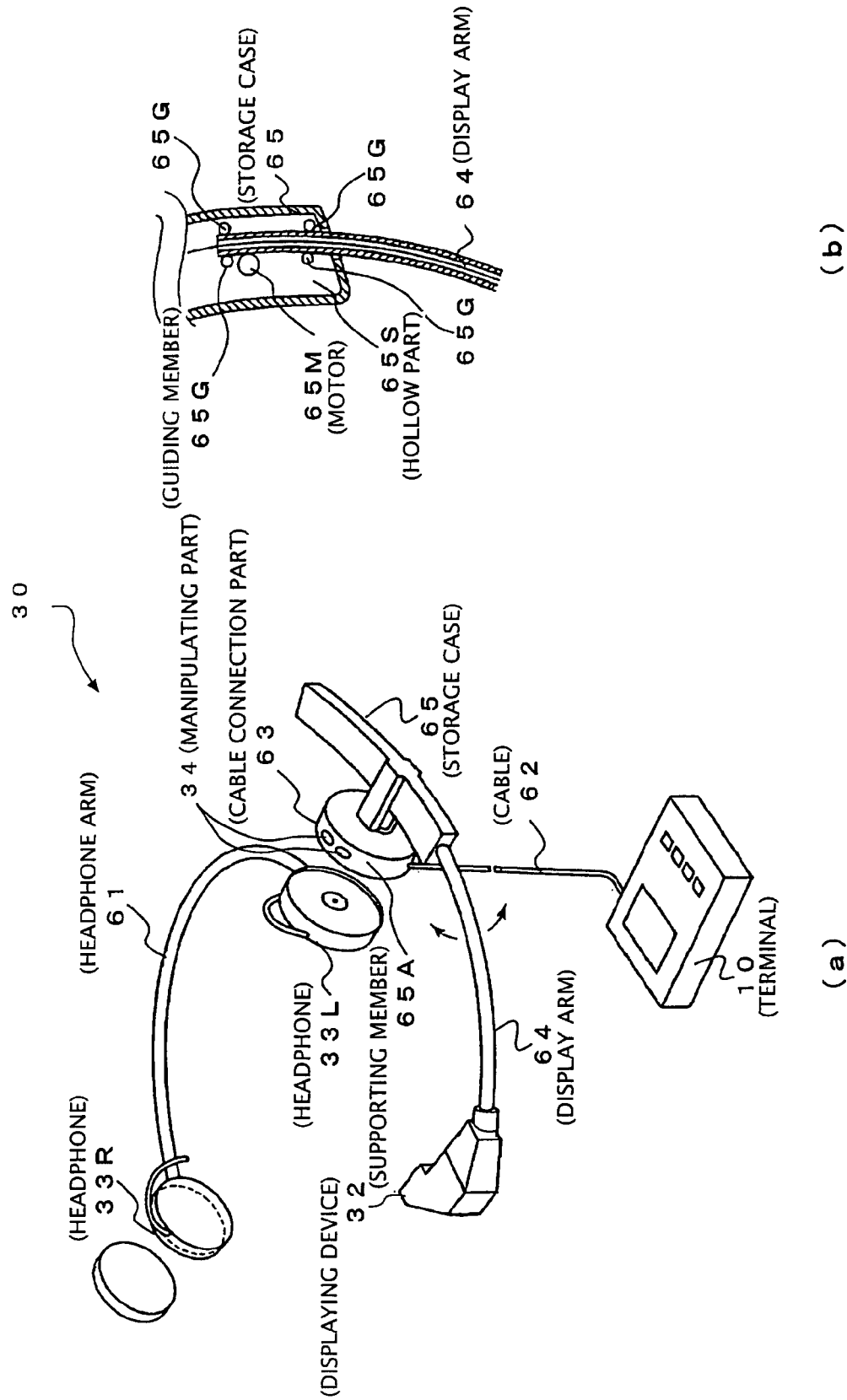

[Fig.3]
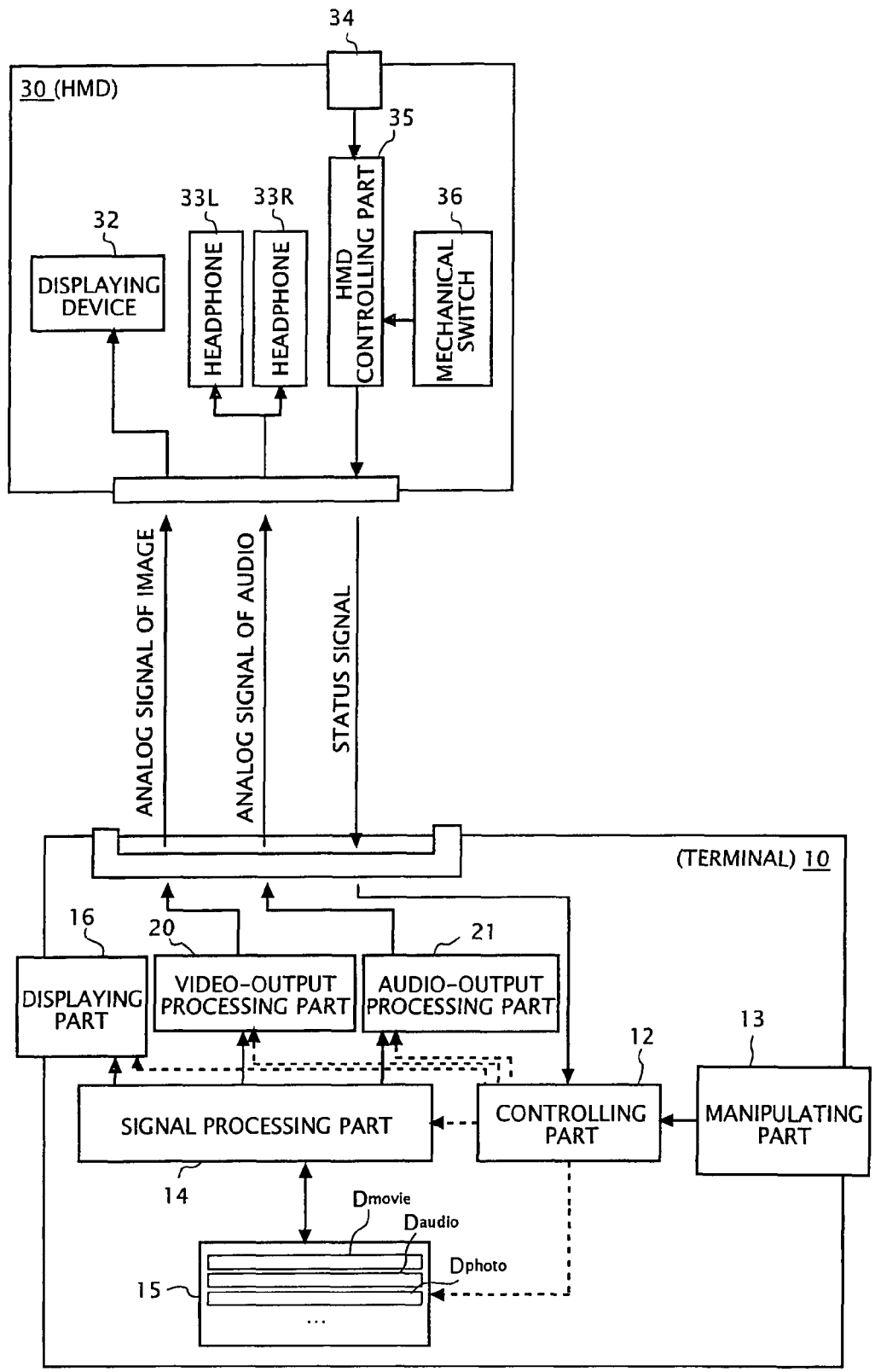

[Fig.4]
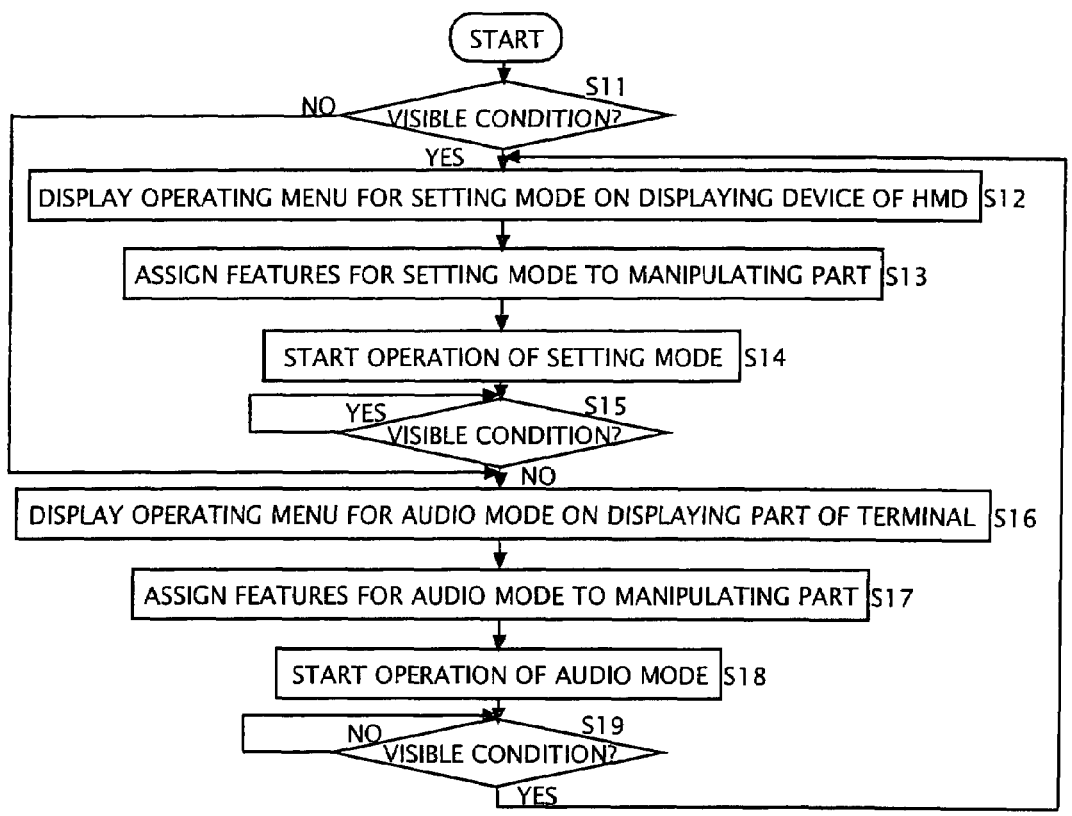

[Fig.5]
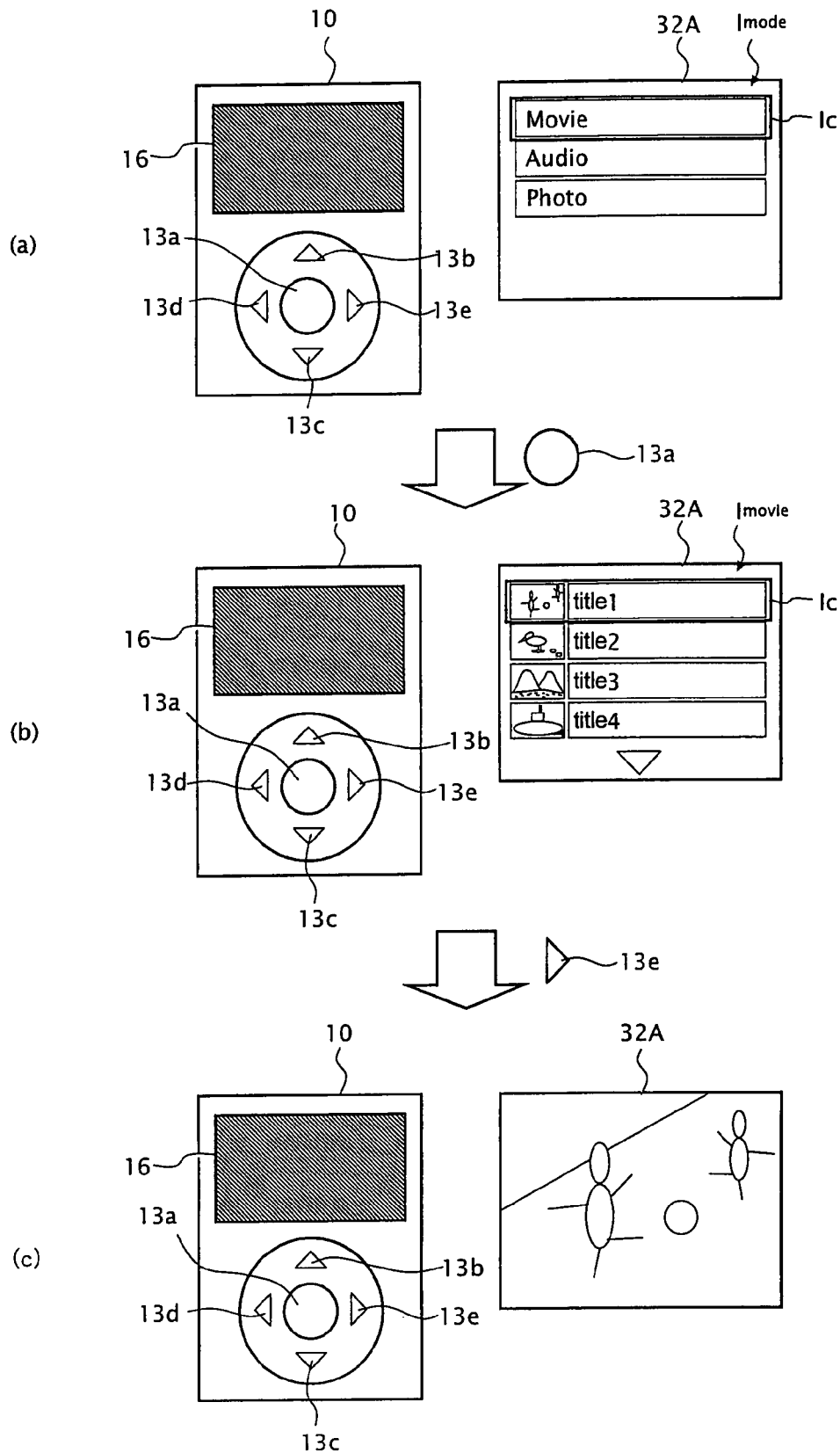

[Fig.6]
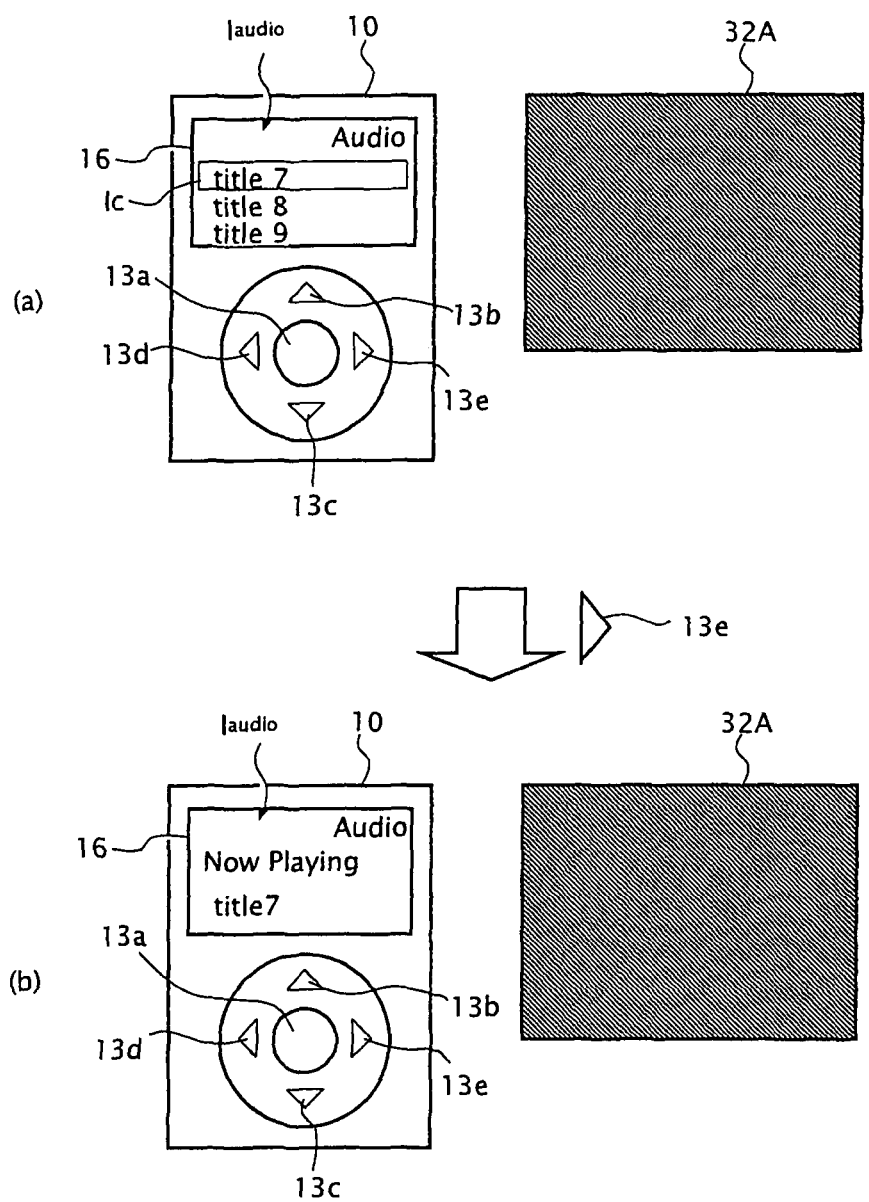

[Fig.7]
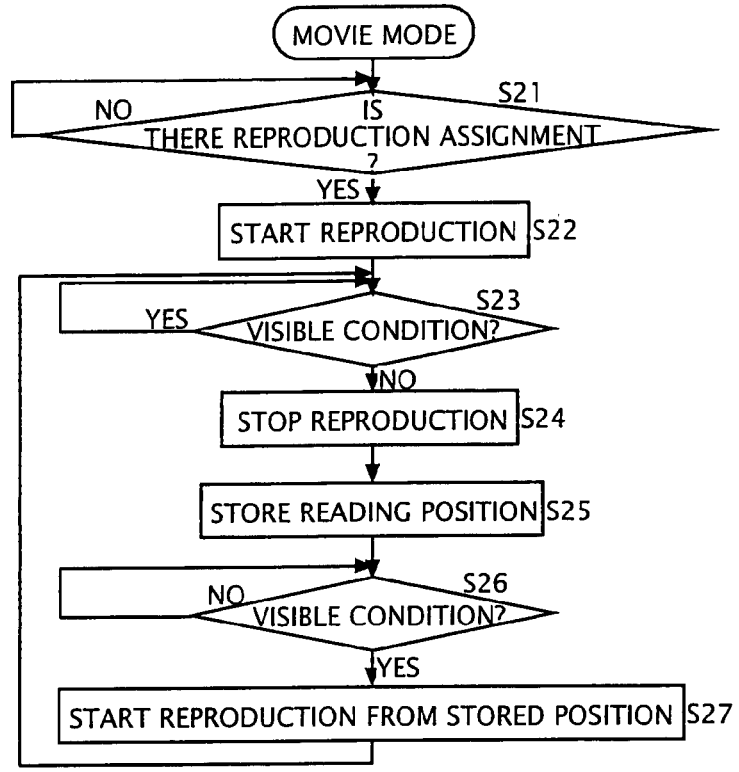
[Fig.8]
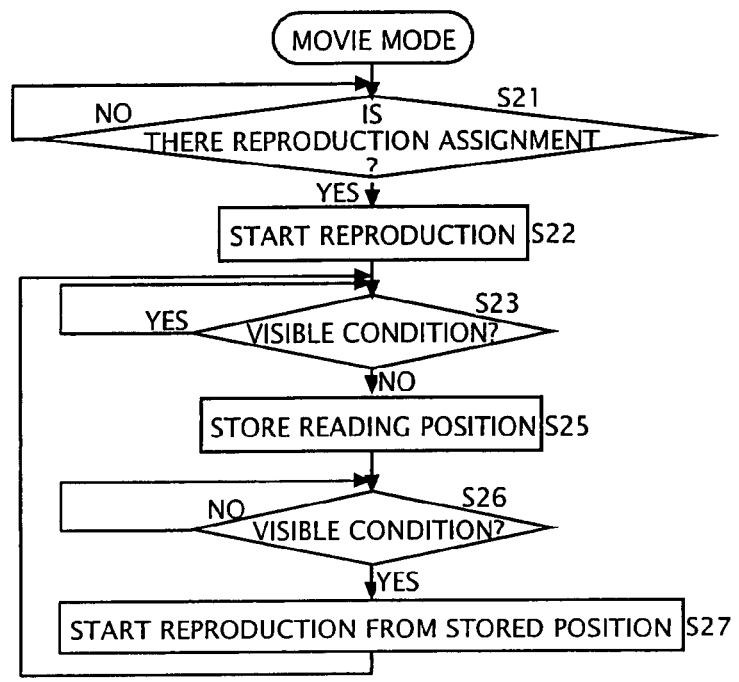

[Fig.9]
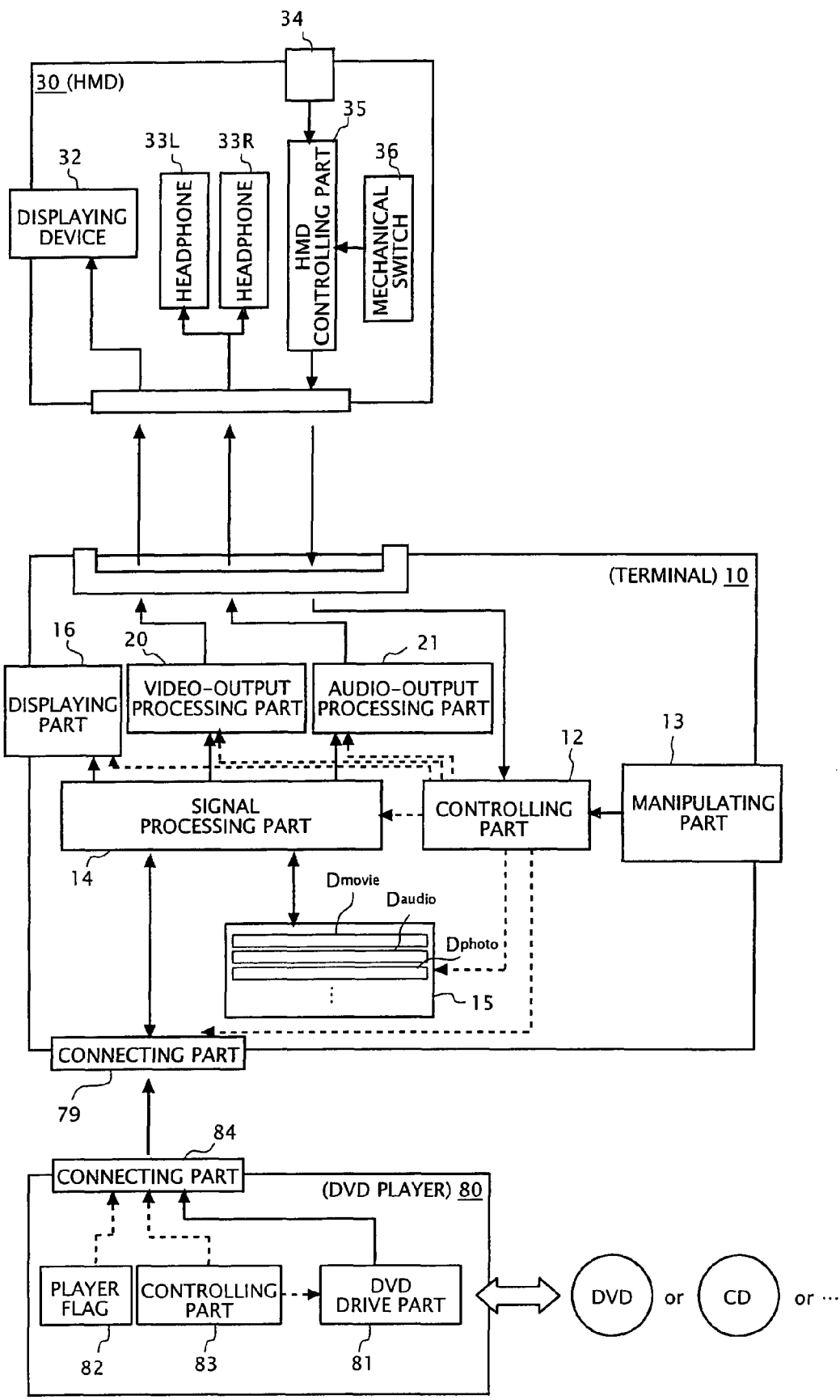

PORTABLE MEDIA PLAYER SYSTEM

CROSS-REFERENCE TO RELATED APPLICATION

This application is a U.S. National Stage application claiming the benefit of prior filed International Application Number PCT/JP2006/318522, filed Sep. 19, 2006, in which the International Application claims priorities from Japanese Application Numbers 2005-284772 (filed on Sep. 29, 2005) and 2006-106126 (filed on Apr. 7, 2006) the entire contents of which are incorporated herein by reference.

TECHNICAL FIELD

The present invention relates to a content reproduction system which includes a device such as a head mounted display or the like and a content reproduction apparatus which reproduces a content.

BACKGROUND ART

Portable media players to which latest electronic technologies are applied are widely gaining popularity due to a reason that low power consumption can be realized, along with reduction in price and size. In media players in recent years, a small storage medium capable of storing image information with a large amount of information and a compression coding technique are combined. Accordingly, it becomes possible to reproduce various contents.

Also, as devices which are connectable to the media players, not only headphones and earphones but head mounted displays (hereinafter referred to as "HMD") such as a near-eye display apparatus and the like are also developed so as to correspond flexibly to needs of users. An HMD is a device which is wearable on a user's head and is capable of projecting a video on a retina from the front of a user's eye. By connecting the HMD to a media player, wearing the HMD on head, and further manipulating a manipulating part of the media player, the user can watch a content including images such as a movie and a music clip.

Patent document 1: Japanese Unexamined Patent Application Publication No. H10-133840

DISCLOSURE

Problems to be Solved

Incidentally, this manipulation is needed to be performed according to a combination of the HMD and a content. However, since the media player has many features and also a large number of contents in wide variety are stored in the storage medium of the media player, the above-described manipulation becomes complicated and not always performed properly.

An object of the present invention is to provide a content reproduction system in which matching of a content reproduction apparatus and a device is performed flexibly and efficiently.

Means for Solving the Problems

A content reproduction system of the present invention includes a content reproduction apparatus which reproduces a content including at least one of audio and an image, and a device connected to the content reproduction apparatus, in which the content reproduction apparatus is provided with an acknowledging unit which acknowledges a driving condition of the device and a controlling unit which operates according to the acknowledged driving condition.

Note that the device may be a device which outputs a content reproduced by the content reproduction apparatus to a user.

Also, the acknowledging unit may acknowledge as the driving condition whether an image included in the content can be displayed effectively by the device or not.

Also, the controlling unit may restrict at least a part of operations of a part related to image reproduction of the content reproduction apparatus and a part related to image display of the device when display of the image by the device is ineffective.

Also, the content reproduction apparatus may be provided with an information displaying part which displays information related to reproduction of the image, and the controlling unit may restrict an operation of a part related to image display of the device when display of the image by the device is ineffective and may restrict an operation of the information displaying part when display of the image by the device is effective.

Also, any one of the content reproduction apparatuses of the present invention may further include an assignment input unit which inputs assignment from the user, in which the controlling unit may eliminate an assignment related to reproduction of the image from the objects to be inputted by the assignment input unit when display of the image by the device is ineffective.

Also, the content reproduction apparatus may include a storing unit which is capable of storing both an image content including an image and a non-image content including no image, and the controlling unit may eliminate an assignment related to reproduction of the image content from the objects to be inputted by the assignment input unit when display of the image by the device is ineffective.

Also, the controlling unit may automatically select a non-image content which is reproduced in past times from the storing unit when display of the image by the device changes from effective to ineffective.

Also, the selected non-image content may be a non-image content reproduced at a same time zone in past times.

Also, the content reproduction apparatus may include a storing unit capable of storing an image content including an image, and during reproduction of the image content, when display of the image by the device changes from effective to ineffective, the controlling unit stores a reproduction position at this time point, and thereafter, when display of the image by the device changes from ineffective to effective, the controlling unit may reproduce the image content again from the stored reproduction position.

Also, the controlling unit may continue reproduction of the image content even when display of the image by the device is ineffective.

Also, the acknowledging unit may acknowledge as the driving condition whether audio included in the content can be outputted effectively by the device or not.

Also, the controlling unit may restrict at least a part of operations of a part related to reproduction of the audio of the content reproduction apparatus when output of the audio by the device is ineffective.

Also, any one of the content reproduction apparatuses of the present invention may further include an assignment input unit which inputs an assignment from the user, in which the controlling unit may eliminate an assignment related to reproduction of the audio from the objects to be inputted by the assignment input unit when output of the audio by the device is ineffective.

Also, the content reproduction apparatus may include a storing unit which is capable of storing both an audio content including audio and a non-audio content including no audio, and the controlling unit may eliminate an assignment related to reproduction of the audio content from the objects to be inputted by the assignment input unit when output of the audio by the device is ineffective.

Also, the device may be a device which supplies data to the content reproduction apparatus.

Effect

In an apparatus or a system to which the present invention is applied, manipulations are simplified significantly, and convenience for the user is increased.

BRIEF DESCRIPTION OF THE DRAWINGS

FIG. 1 is a diagram showing an electrical structure of a first embodiment;

FIG. 2 is a view showing a mechanical structure of the first embodiment;

FIG. 3 is a diagram of a simple electrical structure of a third embodiment;

FIG. 4 is an operation flowchart of a controlling part 12 of the third embodiment;

FIG. 5 is a view showing an overview of when an HMD 30 is in a visible condition;

FIG. 6 is a view showing an overview of when the HMD 30 is in an invisible condition;

FIG. 7 is an operation flowchart (operation flowchart during a movie mode) of a controlling part 12 of a fourth embodiment;

FIG. 8 is a flowchart made by modifying a part of the operation flowchart of FIG. 7; and FIG. 9 is a diagram showing an electrical structure of a fifth embodiment.

DETAILED DESCRIPTION OF THE EMBODIMENTS

First Embodiment

Hereinafter, a first embodiment (content reproduction system) of the present invention will be explained in detail based on the drawings.

First, an electrical structure of the first embodiment will be explained.

FIG. 1 is a diagram showing an electrical structure of the first embodiment. As shown in FIG. 1, the content reproduction system is provided with a terminal 10, an HMD 30, a cradle 40, and so on. Among them, the terminal 10 corresponds to the media player which is already explained. Note that although another device may also be used instead of the HMD 30, here the HMD 30 is explained mainly.

The terminal 10 is provided with a receptacle 10J and a plug 10P, the HMD 30 is provided with a plug 31P, and the cradle 40 is provided with a receptacle 41J. The terminal 10 and the HMD 30 are connected via the receptacle 10J and the plug 31P. Also, the terminal 10 and the cradle 40 are connected via the plug 10P and the receptacle 41J.

First, an electrical structure and a connection relationship of respective parts of the terminal 10 will be explained.

Pins of the receptacle 10J of the terminal 10 are constituted of P group, S group and C group pins. The P group pins are used for delivery of an image signal outputted to the HMD 30, the S group pins are used for delivery of an audio signal outputted to the HMD 30, and the C group pins are used for delivery of control information outputted by the HMD 30. Note that identifiers "P", "S", "C" of these groups are initials of "Picture", "Sound", "Control", respectively.

Also, the pins of the plug 10P of the terminal 10 are constituted of Pi group, Si group, Cio group, and PSi group pins. The Pi group pins are used for delivery of an image signal which is included in a content as an object of video-recording or reproduction, the Si group pins are used for delivery of an audio signal included in similar a content, the Cio group pins are used for delivery of a control signal related to setting and/or monitoring of operations of the terminal 10, and the PSi group pins are used for delivery of power supplied to the power supply circuit 17. Note that the identifiers "Pi", "Si", "Cio", "PSi" of these groups are constituted of upper case letters corresponding to initials of "Picture", "Sound", "Control", "Power Supply" and lower case letters meaning "input", "output", "input/output" indicating a direction of the above delivery on the basis of the terminal 10, respectively.

Among the pins of the receptacle 10J, the C group pins are connected to an input of the connection detecting part 11, and an output of the connection detecting part 11 is connected to a first input port of a controlling part 12. To a second input port of the controlling part 12, an output of a manipulating part 13 is connected, and a first output port of the controlling part 12 is connected to a first input port of a signal processing part 14. Bus terminals of these controlling part 12 and signal processing part 14 are connected to corresponding ports of a memory part 15. Note that the memory part 15 is constituted for example as a hard disk apparatus or an IC memory which is accessed under predetermined area management. A first output port of the signal processing part 14 is connected to a first input of a displaying part 16. To a second input of the displaying part 16, a second output port of the controlling part 12 is connected, and a third output of the controlling part 12 is connected to a controlling terminal of the power supply circuit 17.

Also, among the pins of the plug 10P, the Pi group pins are connected to an input of a video-input processing part 18, and the Si group pins are connected to an input of an audio-input processing part 19. Outputs of these video-input processing part 18 and audio-input processing part 19 are connected to a second and a third input port of the signal processing part 14, respectively. A second output port of the signal processing part 14 is connected to the P group pins of the receptacle 10J via a video-output processing part 20. A third output port of the signal processing part 14 is connected to the S group pins of the receptacle 10J via an audio-output processing part 21. The Cio group pins of the plug 10P are connected to the input/output ports of the controlling part 12, and the PSi group pins of the plug 10P are connected to an input of the power supply circuit 17.

Next, an electrical structure and a connection relationship of respective parts of the HMD 30 will be explained.

As described above, other than the plug 31P which realizes an electrical connection with the terminal 10, the HMD 30 is provided with a displaying device 32, headphones 33L, 33R, a manipulating part 34, and an HMD controlling part 35 which controls the HMD, and so on.

The displaying device 32 and the headphones 33L, 33R are connected to pins corresponding to the already described P group and S group, respectively, among pins of the plug 31P. The HMD controlling part 35 is connected to specific input/ output ports of the controlling part 12 of the terminal 10 via corresponding pins of the plug 31P and the receptacle 10J of the terminal 10. An output of the manipulating part 34 is connected to a part of pins corresponding to the already described C group among the pins of the plug 31P.

Remaining pins of the C group (hereinafter referred to as "sub-C group pins") are grounded in advance according to a combination corresponding to the structure (including type) of the HMD 30, as shown in enlargement at an upper right portion of FIG. 1. These sub-C group pins are used separately for delivery of binary information to the terminal 10, together with a ground terminal GND which is the basis of the aforementioned grounding. By the binary information, the terminal 10 becomes capable of identifying the structure of a device (hereinafter referred to as "connectable device") which is connected to the receptacle 10J of the terminal 10. For distinguishing from other devices, the binary information are constituted of, for example, the following respective binary information.

(a) First binary information indicating whether or not a connectable device is a device hmd (hereinafter referred to as "head mounted display") which is capable of reproducing only an image signal.
(b) Second binary information indicating whether or not a connectable device is a device hmd•hp (hereinafter referred to as "head mounted display headphone" below) which is capable of outputting both an image signal and an audio signal.
(c) Third binary information indicating whether or not a connectable device is a device hp (hereinafter referred to as "headphone") which is capable of reproducing only an audio signal.
(d) Fourth binary information indicating whether or not a connectable device includes a manipulating part op corresponding to the already described manipulating part 34.

Incidentally, the HMD 30 includes both a headphone and a displaying part, and therefore is the head mounted display headphone (b).

Note that one connectable device (HMD 30 in FIG. 1) is connected directly to the terminal 10 of this embodiment, but such a connectable device (HMD 30 in FIG. 1) may be connected via for example a remote controller 50 shown by a frame of a chain double-dashed line in a substantially right central portion of FIG. 1. Also, a plurality of connectable devices may be connected in parallel to the terminal 10. Further, the plurality of connectable devices may be connected in parallel via one or more receptacles (included in the terminal 10 together with the receptacle 10J).

Note that the above-described remote controller 50 includes a manipulating part 52 corresponding to a manipulating part of a connectable device (HMD 30 in FIG. 1), a plug 51P adapted to the receptacle 10J of the terminal 10, and a receptacle 51J which is suitable for connection to a connectable device and the plug 31P of the connectable device (HMD 30 in FIG. 1). The manipulating part 52, the plug 51P, the receptacle 51J are connected via wirings which realize relaying among these three parts. Also, the remote controller 50 as above may also be provided with a displaying device corresponding to the displaying part 16 of the terminal 10.

Next, an electrical structure of the cradle 40 and a connection relationship of respective parts thereof will be explained.

The receptacle 41J of the cradle 40 realizes an electrical connection with the terminal 10 via the plug 10P of the terminal 10. Among pins of the receptacle 41J, to pins corresponding to the already-described Pi group, Si group, Cio group and PSi group, there are connected a video-input terminal 42, an audio-input terminal 43, a control-input/output terminal 44 and a power-input terminal 45, respectively. The cradle 40 is connectable to information terminal equipment (such as computer) via these terminals.

Next, basic operations of electrical components of this embodiment will be explained. Here, a case where the connectable device of the terminal 10 is the HMD 30 and the remote controller 50 is not used will be explained.

The power supply circuit 17 provided in the terminal 10 has a not-shown battery, and store power supplied from the cradle 40 in the battery. At this time, the power is supplied to the power supply circuit 17 via the power-input terminal 45 provided in the cradle 40, the receptacle 41J of the cradle 40, the plug 10P of the terminal 10 in order. Further, the power supply circuit 17 supplies power stored in the battery in this manner to the respective parts of the terminal 10 as driving power, and also supplies driving power to the HMD 30. Between them, the driving power to the HMD 30 is supplied via predetermined pins of the receptacle 10J of the terminal 10 and predetermined pins of the plug 31P of the HMD 30.

To the video-input terminal 42 of the cradle 40, an image signal is inputted from information terminal equipment. This image signal is inputted to the video-input processing part 18 of the terminal 10 via the receptacle 41J of the cradle 40 and the plug 10P of the terminal 10. The video-input processing part 18 performs processing of A/D conversion and/or the like on the image signal to generate digital image information, and gives digital image information thereof to the signal processing part 14.

To the audio-input terminal 43 of the cradle 40, an audio signal is inputted from the information terminal equipment. This audio signal is inputted to the audio-input processing part 19 of the terminal 10 via the receptacle 41J of the cradle 40 and the plug 10P of the terminal 10. The audio-input processing part 19 performs processing of A/D conversion and/or the like on the audio signal to generate digital audio information, and gives the digital audio information to the signal processing part 14.

The controlling part 12 of the terminal 10 performs predetermined processing according to all or a part of the following assignments and conditions, and specifies signal processing to the signal processing part 14 as necessary.
(a) Assignment given by the user via the manipulating part 13 of the terminal 10.
(b) Assignment given from information terminal equipment (personal computer or the like) via the control-input/output terminal 44 of the cradle 40.
(c) Information regarding a condition of the HMD 30 delivered from the HMD 30 when the manipulating part 34 of the HMD 30 is manipulated by the user.

Note that the information (c) are delivered to the controlling part 12 via the plug 31P, the receptacle 10J and the connection detecting part 11.

Based on an assignment and information obtained in this manner, the controlling part 12 controls the respective parts such as the signal processing part 14. The signal processing part 14 is controlled by the controlling part 12, and stores for example one or both of the above-described image information and audio information (hereinafter simply referred to as "digital content") in the memory part 15 in an appropriate file format.

Here, as types of the digital content, there are for example a video content with audio including audio information and image information (dynamic-image information), an audio content including only audio information, an image content including only image information (static-image information), and so on, but here processing in a case that the digital content stored in the memory part 15 is a video content with audio will be explained.

When the signal processing part 14 reads a desired digital content (here a video content with audio) stored already in the memory part 15, the signal processing part 14 delivers image information included in the digital content (here a video content with audio) to the video-output processing part 20, and delivers audio information included in the digital content (here a video content with audio) to the audio-output processing part 21. Note that a storage area to be a target of writing or reading to/from the memory part 15 is determined under an area management performed by the signal processing part 14 or the controlling part 12.

The video-output processing part 20 performs processing of D/A conversion and/or the like on the aforementioned image information to generate an analog signal of an image, and delivers such an analog signal to the HMD 30. Also, the audio-output processing part 21 performs processing of D/A conversion and/or the like on the aforementioned audio information to generate an analog signal of audio, and delivers such an analog signal to the HMD 30. Delivery of these analog signals of image and audio (here a video content with audio) is performed via the receptacle 10J of the terminal 10 and the plug 31P of the HMD 30.

The HMD 30 provides the content (here a video content with audio) outputted from the terminal 10 to the user via the displaying device 32 and/or the headphones 33L, 33R. At this time, the analog signal of audio delivered from the terminal 10 is given to the headphones 33L, 33R, and the analog signal of image delivered from the terminal 10 is given to the displaying device 32.

Also, the HMD controlling part 35 of the HMD 30 controls a not-shown volume which controls outputs of the headphones 33L, 33R. This control of volume is performed according to manipulation contents of the manipulating part 34. Therefore, the user can change the volume of audio emitted from the headphones 33L, 33R by appropriately manipulating the manipulating part 34.

Also, the signal processing part 14 of the terminal 10 can output for example the following information as an image to one or both of the displaying part 16 of the terminal 10 and the displaying device 32 of the HMD 30.
(a) Content information of a digital content stored in the memory part 15.
(b) A message to be notified to the user.

Note that the message (b) is notified to the user according to "manipulation of this system" such as manipulation contents of the manipulating part 13 of the terminal 10, manipulation contents of the manipulating part 34 of the HMD 30, movement of the displaying device 32 of the HMD 30, and so on.

Hereinafter, a screen on which the content information (a) or the message (b) is displayed is referred to as "operating menu". While viewing this operating menu, the user can give an appropriate assignment such as a start of reproduction to the terminal 10.

Note that the displaying part 16 of the terminal 10 may also be capable of displaying an image included in a content in addition to such an operating menu, but for simplicity, only the operating menu is to be displayed here.

Next, a mechanical structure of this embodiment will be explained.

Also here, a case where the connectable device of the terminal 10 is the HMD 30 and the remote controller 50 is not used will be explained.

FIG. 2(*a*) is an entire structure view of the content reproduction system, and FIG. 2(*b*) is a partial cross-sectional view of a storage case 65 constituting the HMD 30.

As shown in FIG. 2(*a*), in the HMD 30, the headphones 33L, 33R are attached to both ends of a headphone arm 61. The headphone arm 61 is constituted of a member formed in a curved shape. The displaying device 32 is attached to one end of a display arm 64. The display arm 64 is formed with a predetermine curvature. The other end of the display arm 64 is held by the storage case 65. This storage case 65 has, as shown in FIG. 2(*b*), a hollow part 65S in which the display arm 64 can be stored and a guiding member 65G constituted of a plurality of bearings disposed in the hollow part 65S. Further, as shown in FIG. 2(*a*), on a side wall of the storage case 65, a supporting member 65A which is capable of engaging with the headphone 33L and also doubles as a cable connection part 63 is provided. Also, between the supporting member 65A and the storage case 65, an articulating mechanism is provided, which can pivotally move the display arm 64 in arrow directions. Note that this cable connection part 63 is connected to the terminal 10 via the already-described plug 31P (not shown in FIG. 2), a cable 62, the receptacle 10J (not shown in FIG. 2). Accordingly, the displaying device 32 of the HMD 30 is connected to the terminal 10 (output of the video-output processing part 20 of the terminal 10). This connection is made by coupling, inside the cable connection part 63, a wiring reaching the inside of the cable connection part 63 via the inside of the display arm 64 and the hollow part 65S of the storage case 65 with a core wire assigned to the already described P group pins among core wires of the cable 62.

Also, the HMD controlling part 35 (not shown in FIG. 2) of the HMD 30 is, for example, disposed inside the cable connection part 63. Further, the HMD controlling part 35 is connected via the aforementioned wiring to a motor 65M which gives necessary motive energy for moving the display arm 64 along the guiding member 65G and to a sensor (not shown) which detects the position of the display arm 64. Also, the articulating mechanism part provided between the supporting member 65A and the storage case 65 also has a not-shown sensor, which is connected to the HMD controlling part 35.

Then, the HMD controlling part 35 detects with the sensors whether or not the display arm 64 is in a condition of being stored in the storage case 65, whether or not the displaying device 32 is in a condition of being in front of a user's eye, and so on, and controls the motor 65M or outputs to the audio-output processing part a message of audio or the like so as to let the user move the displaying device 32 to the front of an eye, according to results from the sensors and an instruction from the controlling part 12.

Timing of such reeling out and storing of the display arm 64 by the HMD controlling part 35 is determined by manipulation contents of the manipulating part 34. Therefore, the user can perform reeling out and storing of the display arm 64 by desired timing by manipulating the manipulating part 34 appropriately.

Next, characteristic operations of this embodiment will be explained based on FIG. 1.

Characteristics of this embodiment reside in the following processing performed by the controlling part 12 and the signal processing part 14 in the terminal 10. This processing is performed in cooperation with the connection detecting part 11.

In the terminal 10, the connection detecting part 11 and the controlling part 12 identify which one of the following the structure of the connectable device corresponds to.
(a) Head mounted display including no manipulating part.

(b) Head mounted display headphone including no manipulating part.
(c) Headphone including no manipulating part.
(d) No connectable device connected.
(a') Head mounted display including a manipulating part.
(b') Head mounted display headphone including a manipulating part.
(c') Headphone including a manipulating part.

Incidentally, when the connectable device is the HMD 30, it is identified to be corresponding to the head mounted display headphone including a manipulating part (b').

This identification is performed based on the condition of a pin (or a combination of pins) belonging to the above-described sub-C group pins of the connectable device. Note that the respective types of connectable devices all have a plug that matches with the receptacle 10J and are connected based on a common pin arrangement. Also, in the respective types of connectable devices, grounding of pins are made by a wiring pattern or the like provided in the connectable devices.

Also, whether the connectable device has a manipulating part or not is determined based on the already-described fourth binary information. Further, the type of the connectable device is identified based on logic values of the already-described first to third binary information (the binary information are delivered from the connectable device to the controlling part 12 via the receptacle 10J and the connection detecting part 11).

Assuming the case where a manipulating part is included in the connectable device ((a'), (b'), (c')), the controlling part 12 performs control of the respective parts of the terminal 10 and the connectable device based on respective manipulation contents of the manipulating part of the connectable device and the manipulating part 13 of the terminal 10. However, when the connectable device is connected to the terminal 10 via the remote controller, the controlling part 12 performs control of the respective parts of the terminal 10 and the connectable device based on respective manipulation contents of the manipulating part of the connectable device, the manipulating part 13 of the terminal 10, and the manipulating part of the remote controller.

However, inversely, when no manipulating part is included in the connectable device ((a), (b), (c)), the controlling part 12 performs control of the respective parts of the terminal 10 and the connectable device based on manipulation contents of only the manipulating part 13 provided in the terminal 10. However, when the connectable device is connected to the terminal 10 via the remote controller, the controlling part performs control of the respective parts of the terminal 10 and the connectable device based on respective manipulation contents of the manipulating part 13 of the terminal 10 and the manipulating part of the remote controller.

In other words, the user can give an assignment to the terminal 10 by manipulating any one of the manipulating part of the connectable device, the manipulating part of the remote controller, and the manipulating part 13 of the terminal 10.

Further, the controlling part 12 identifies an effective structure and condition of the connectable device based on the structure (type) of the connectable device which is identified in this manner and on the assignment given by the user (for example, a notification indicating that audio information or image information become reproducible by a touch by the user on each part of the connectable device).

For example, when the connectable device is the head mounted display including a manipulating part (a') or the head mounted display headphone including a manipulating part (b'), the controlling part 12 identifies whether an output of image information by the connectable device is effective or not based on manipulation contents of the manipulating part of the connectable device. A condition that an output of image information by the connectable device is effective is a condition that the displaying device of the connectable device is located opposing an eye of the user, and projection of image information to the retina of the user is possible. Hereinafter, this condition is referred to as "visible condition".

Also, when the connectable device is the headphone including a manipulating part (c') or the head mounted display headphone including a manipulating part (b'), the controlling part 12 determines whether an output of audio information by the connectable device is effective or not based on manipulation contents of the manipulating part of the connectable device. A condition that an output of audio information is effective is a condition that the volume of the headphone is set to a value other than "0" and it is possible to emit audio to an ear of the user. Hereinafter, this condition is referred to as "audible condition".

Moreover, the controlling part 12 of this embodiment performs a different operation according to whether the connectable device is in a visible condition or not, and also performs a different operation according to whether the connectable device is in an audible condition or not.

Next, the operation of the controlling part 12 will be explained in detail.

Also here, a case where the connectable device is the HMD 30 and the remote controller 50 is not used will be explained. Also, the features of reeling/storing operations of the display arm 64 are assigned not only to the manipulating part 34 of the HMD 30 but also to the manipulating part 13 of the terminal 10. Further, to the manipulating part 13 of the terminal 10, also a feature of reproducing operation of various contents, a feature of tone and volume controlling operation with respect to the headphones 33L, 33R of the HMD 30, a feature of adjusting image quality with respect to the displaying device 32 of the HMD 30, a feature of adjusting brightness with respect to the displaying device 32, and so on are also assigned.

(Operations of the Controlling Part 12 when the HMD 30 Migrates from a Visible Condition to an Invisible Condition)

In a condition that the display arm 64 of the HMD 30 is stored in the storage case 66, the controlling part 12 acknowledges that the displaying device 32 is in an invisible condition based on a signal sent from the HMD controlling part 35. In such a condition, the controlling part 12 removes a part related to an image signal output of the displaying device 32 from the objects to be controlled. Specifically, the controlling part 12 stops driving of the video-output processing part 20 and stops supplying of power from the power supply circuit 17 to the video-output processing part 20. Then, the controlling part 12 removes a part which is confirmed to be stopped from the objects to be controlled. Also, the controlling part 12 makes the HMD controlling part 35 to stop supplying of power to the displaying device 32 of the HMD 30. By these controls, reduction of power consumption and reduction of load on the controlling part 12 are achieved.

Further, the controlling part 12 instructs the power supply circuit 17 to start supplying power to the video-input processing part 18, and then the controlling part 12 starts controlling of the video-input processing part 18. Thus, by creating a condition that video-recording is possible, control is performed such that an image can be recorded in a condition that a video is not viewed.

Also, control as follows is performed by the controlling part 12. Among operations inputted to the manipulating part 13 of the terminal 10, a reeling operation to the display arm 64, a reproducing operation of an audio content, a tone and volume changing operation, an operation regarding display to the displaying part 16, and so on are accepted, and meanwhile an operation regarding the displaying device 32 of the HMD 30 is not accepted. Specifically, features of the manipulating parts 13, 34 and contents of an operating menu displayed on the displaying part 16 are changed so that adjustment regarding image quality and brightness of the displaying device 32 of the HMD 30 and a reproducing operation of a video content with audio and an image content cannot be executed or an assignment thereof cannot be inputted.

(Operations of the Controlling Part 12 when the HMD 30 Migrates from an Invisible Condition to a Visible Condition)

When the display arm 64 of the HMD 30 is reeled out and the HMD controlling part 35 acknowledges that the displaying device 32 of the HMD 30 is in a visible condition, the HMD controlling part 35 transmits a signal including these information to the controlling part 12. The controlling part 12 receives this and instructs the power supply circuit 17 to start supplying power to the video-output processing part 20, to thereby start controlling of the video-output processing part 20. Further, the controlling part 12 also instructs the HMD controlling part 35 to start supplying power to the displaying device 32 of the HMD 30.

On the other hand, the video-input processing part 18 is removed from the objects to be controlled by the controlling part 12, and the controlling part 12 instructs the power supply circuit 17 to stop supplying of power to the video-input processing part 18.

Thus, controlling and supplying of power to the respective parts which are necessary for driving of the displaying device 32 of the HMD 30 are started.

On the other hand, by driving of the displaying device 32, controlling and supplying of power for parts which are not necessary for displaying are stopped. For example, just after the HMD 30 migrates to a visible condition, the controlling part 12 makes the displaying device 32 of the HMD 30 display an operating menu. At this time, displaying of an operating menu on the displaying part 16 is not necessary, and hence the displaying part 16 is automatically made to stop driving (supplying of power is stopped). Alternatively, instead of making the displaying part 16 to stop driving automatically, the controlling part 12 may make the displaying part 16 to stop driving at timing when a certain particular operation is performed.

Here, also operations are changed as follows. To enable a reproducing operation of an image content with audio and an image content and/or various adjustment to the displaying device 32 of the HMD 30 for which an operation is not accepted or for which an assignment cannot be inputted until now, the display of the operating menu changes. Of course, at this time, a reproducing operation of an audio content or various adjustments regarding audio become executable (the above are operations at the time of migration to a visible condition).

Thus in this embodiment, according to whether the displaying device 32 of the HMD is in a visible condition or in an invisible condition, a reproducible content is limited and/or an items which can be manipulated/controlled is limited. Therefore, the user does not choose an inappropriate operation anymore in a current condition of each apparatus, and it becomes possible to prevent execution of a useless operation. Of course, it also serves to prevent a wrong operation.

Next, operations of the controlling part 12 when the HMD 30 changes between an audible condition and an inaudible condition when the displaying device 32 of the HMD 30 is in a visible condition will be explained.

(Operations of the Controlling Part 12 when the HMD 30 Migrates from an Audible Condition to an Inaudible Condition)

When an output of the volume in the HMD 30 is set to "0" from a condition that the volume in the HMD 30 is set to other than "0", the HMD controlling part 35 detects this from manipulation contents of the manipulating part 34, and transmits the information to the controlling part 12. Upon reception of the information, the controlling part 12 removes parts related to outputting of audio from the objects to be controlled. Specifically, the controlling part 12 stops driving of the audio-output processing part 21 and stops supplying of power to the audio-output processing part 21 from the power supply circuit 17. Then, the controlling part 12 removes a part that is confirmed to be stopped from the objects to be controlled. By these controls, reduction of power consumption and reduction of load on the controlling part 12 are achieved.

Further, the controlling part 12 instructs the power supply circuit 17 to start supplying power to the audio-input processing part 19, and then the controlling part 12 starts controlling of the audio-input processing part 19. Thus, by creating a condition that audio-recording is possible, control is performed such that audio can be recorded in a condition that audio is not listened.

Also, control as follows is performed by the controlling part 12. Among operations inputted to the manipulating part 13, a reeling operation to the display arm 64, a reproducing operation of an audio content, an image quality and brightness adjusting operation, an operation regarding display to the displaying part 16, and so on are accepted, and meanwhile an operation of the respective parts which handle a signal outputted to the headphones 33L, 33R is not accepted. Specifically, features of the manipulating parts 13, 34 and display (contents) of an operating menu displayed on the displaying part 16 are changed so that adjustment regarding audio quality and a reproducing operation of an audio content cannot be executed or an assignment thereof cannot be inputted.

(Operations of the Controlling Part 12 when the HMD 30 Migrates from an Inaudible Condition to an Audible Condition)

On the other hand, inversely, when the volume is turned up and a condition that audio can be outputted from the headphones is created, supplying of power to the audio-output processing part 21 is started and controlling of the audio-output processing part 21 by the controlling part 12 is performed as described above. Also, contents of the operating menu is changed so that selection of an audio content and adjustment regarding audio quality can be performed. Note that regarding the audio-input processing part 19, the power supply circuit 17 is controlled so that driving thereof is stopped and supplying of power thereto is not implemented (the above are operations at the time of migration to an audible condition).

Thus, in this embodiment, by controlling the terminal 10 according to driving conditions of the respective parts of the HMD 30, wasted power consumption is reduced and a possibility to allow the user to select an unnecessary operation can be lowered.

Note that the controlling part 12 of this embodiment performs determination of a visible condition and an invisible condition of the HMD 30 based on manipulation contents of the manipulating part 34, but the controlling part 12 may perform this based on outputs of the sensors (described above) for detecting the position of the display arm 64.

Also, in the HMD 30 of this embodiment, the reeling out and storing of the display arm 64 are motorized by the motor, but they may be performed manually. Even in this case, when a position sensor (a mechanical switch and the like can be used) is provided in the driving part of the display arm 64, it is possible to determine a visible condition and an invisible condition, similarly to the explanation given above.

Second Embodiment

Next, as a second embodiment, controls when the terminal 10 is connected to the cradle 40 will be explained. Here, only differences from the first embodiment will be explained.

The controlling part 12 identifies whether the terminal 10 is connected to the cradle 40 or not at a predetermined frequency. Note that the plug 10P is provided with a not-shown mechanical switch, and when the receptacle 41J of the cradle 40 is connected to the plug 10P, the mechanical switch turns on, which is identified as a change of a logical value of binary information indicating whether a connection is made or not.

Also, when the controlling part 12 detects that the terminal 10 is connected to the cradle 40, the controlling part 12 performs any one of the following processing when the connectable device is the HMD 30.

[1] By cooperation with the HMD controlling part 35, the motor 65M is controlled so that the display arm 64 is automatically stored in the storage case 65 along the guiding member 65G to thereby retract the displaying device 32. Further, when storing (retracting) of the display arm 64 in the storage case 65 is identified via the above-described sensors, the motor 65M is stopped and supplying of power to the motor 65M is stopped.

[2] Also, before storing of the display arm 64 by the motor 65M, a notification "please retract the displaying device 32" as a message of image information and/or audio information is given to the user via a part or all of the displaying part 16, the displaying device 32 and the headphones 33L, 33R by the signal processing part 14. Further, when storing (retracting) of the display arm 64 into the storage case 65 is identified with the above-described sensors and the HMD controlling part 35, outputting of this message is stopped.

Specifically, when the cradle 40 is connected to the terminal 10 according to "handling" of the terminal 10 done by the user, the display arm 64 is automatically stored (retracted) into the storage case 65. Alternatively, an operation related to such storage (retraction) is prompted to the user automatically.

Therefore, according to this embodiment, since a condition that the display arm 64 is not stored (retracted) into the storage case 65 does not continue for a long time, a possibility of breakage that occurs due to contact of an object such as a human body with the display arm 64 and/or the displaying device 32 decreases significantly.

Further, since the display arm 64 is stored and the displaying device 32 is in an invisible condition, the controlling part 12 removes from the objects to be controlled a part related to a video signal output to the displaying device 32, as described in the above first embodiment. Specific operations are the same as in the first embodiment, and explanations thereof are omitted here.

Note that when connected to the cradle 40, it is often a case of recording (audio-recording or video-recording) to the terminal 10 or charging thereof, and hence control to also stop outputting of audio to the headphones 33L, 33R may be performed automatically.

However, regarding outputting of audio, it is preferable that outputting can be performed by a manipulation of the manipulating part 13 or the manipulating part 52 of the remote controller. For example, to fulfill a request for listening or watching while the terminal 10 is connected to the cradle 40, it is preferable that at least an operation of audio output is allowed, and a video output can be displayed on the displaying device 32 by further performing an operation to pull out the display arm 64 from the storage case 65.

Note that in this embodiment, when for example a release of connection between the terminal 10 and the cradle 40 is detected in a condition that the HMD 30 (which may be either the hmd or the hmd•hp described above) is connected to the terminal 10, the controlling part 12 may respond in a leading manner and automatically release the storage (retraction) of the display arm 64 in the storage case 65.

Incidentally, once connected to the cradle 40, the terminal 10 may migrate automatically to any one of "video-recording mode", "audio-recording mode", and "video/audio-recording mode".

According to this embodiment, the manipulation performed by the user to carry out video-recording or audio-recording in the terminal 10 via the cradle 40 is simplified significantly.

Note that the format of a file to be stored as a content in the memory part 15 in the "audio-recording mode" and "video/audio-recording mode" is desired to be the MP3 format and the MPEG2-AAC (Advanced Audio Coding) format for example, which are indicated by a specific extension, but may be separately set or selected based on the already described man-machine interface.

Further, in this embodiment, when driving of setting or the like is stopped according to the connectable device, the video-output processing part 20 and the audio-output processing part 21 may be restricted in one or both of operation and supply of driving power.

Supplements to the First Embodiment and the Second Embodiment

Note that in the above-described embodiments, detection of a connection of the connectable device and the cradle 40 and the terminal 10 as well as a structure or a condition of the connectable device is performed based on logic values of the already described first to fourth binary information. However, such detection may be realized based on any one of the following items, or may be realized under any distribution of functions between the connectable device and the cradle 40 and the terminal 10.

(1) Potential and/or impedance of a wiring connected to the connectable device via any one of the pins of the receptacle 10J

(2) Information delivered from the connectable device via the wiring (3) Procedure of cooperation with the connectable device performed via the wiring (4) Presence or level of an Image signal and/or an audio signal inputted to the video-input processing part 18 and/or the audio-input processing part 19 from the cradle 40

(5) Potential and/or impedance of a wiring connected to the cradle 40 via any one of the pins of the plug 10P

(6) Information delivered from the cradle 40 via the wiring (7) Procedure of cooperation with the cradle 40 performed via the wiring Further, in the above-described embodiments, the controlling part 12 identifies an effective device (effective element of the connectable device) based on an assignment given by the user, with consideration of the structure (type) of the connectable device identified based on logic values of the already described first to third binary information delivered from the connectable device. However, such an effective device may be identified directly by the controlling part 12 as a combination of the already described first to third information (which may include a predetermined number of binary information delivered to the terminal 10 together with these binary information). The binary information change according to a manipulation performed via the manipulating part 34 in the HMD 30 and are delivered to the connection detecting part 11 by the manipulating part 34.

Also, while in the storing mode, the signal processing part 14 may operate it so that a signal inputted to the cradle is detected and thereby the signal can be recorded in an appropriate file format according to appropriateness of the signal.

Also, as an example of an embodiment of the present invention, the above-described functions performed by the controlling part 12 may be performed by information terminal equipment (for example, a personal computer). In this case, the control-input/output terminal of the cradle 40 and the personal computer are connected. Also, in this case, predetermined software is installed in the personal computer. This software is for manipulating a program performed in the above-described controlling part 12 by the personal computer. Note that the connection of the cradle 40 and the personal computer may be performed with a serial bus such as USB (registered trademark) or Fire wire (registered trademark). In this case, exchange can be performed from the same terminal for music data, video data or the like, and of course the control of the terminal 10 can be exchanged from the same terminal.

Further, in the above-described embodiments, setting for allowing or not allowing an operation or manipulation, intermittence of driving power, and switching of a reproducible content based on a condition of an effective device or the like may be performed for a corresponding circuit provided in the connectable device.

Further, the present invention is not limited to the above-described embodiments and various embodiments are possible within the range of the present invention, and any kind of modification may be made on a part or all of the components.

Third Embodiment

Hereinafter, a third embodiment of the present invention will be explained in detail based on the drawings. Here, main differences from the first embodiment will be explained. The main differences reside in operations of the controlling part 12, but in this explanation, FIG. 3 in which parts which are not related to the explanation are omitted is used. In FIG. 3, shown by dotted lines are paths of a control signal given from the controlling part 12 to the respective parts.

Also, the HMD 30 shown in FIG. 3 is provided with a mechanical switch 36. The mechanical switch 36 is turned on only when, for example, the display arm (reference numeral 64 in FIG. 2) is reeled out and a visible condition is assured, and is turned off when the display arm is retracted or stored. This mechanical switch 36 is provided for example in the storage case (reference numeral 65 in FIG. 2).

The HMD controlling part 35 generates a signal (status signal) indicating whether the HMD 30 is in a visible condition or not based on an output of the mechanical switch 36, and transmits the signal to the controlling part 12 of the terminal 10 at a predetermined frequency. The controlling part 12 receives this status signal and monitors whether the HMD 30 is in a visible condition or not.

Also, the memory part 15 of the terminal 10 stores a video content with audio $D_{movie}$ including audio information and image information (dynamic-image information), an audio content $D_{audio}$ including only audio information, and an image content $D_{photo}$ including only image information (static-image information).

Also, the controlling part 12 of the terminal 10 switches the mode of the terminal 10 to various modes according to manipulation contents of the manipulating part 13.

Modes of this embodiment include several types of reproducing modes, namely, "movie mode" in which a video content with audio $D_{movie}$ can be reproduced, "audio mode" in which an audio content $D_{audio}$ can be reproduced, and "photo mode" in which an image content $D_{photo}$ can be reproduced.

Also, the modes of this embodiment also includes a "setting mode" for the user to select one of the several types of reproducing modes and set this mode to the terminal 10. Note that in this setting mode, as one of modes which can be set by the user, there may be prepared a "storing mode". The storing mode is a mode in which various types of contents inputted from information terminal equipment can be recorded in the memory part 15.

Next, the operation of the controlling part 12 in this embodiment will be explained.

FIG. 4 is an operation flowchart of the controlling part 12 of this embodiment.

As shown in FIG. 4, the controlling part 12 determines whether the HMD 30 is in a visible condition or not by the status signal (Step S11).

When it is determined to be in a visible condition (Step S11, YES), the controlling part 12 displays an operating menu of the setting mode on the displaying device 32 of the HMD 30 (Step S12). At this time, the signal processing part 14 generates an image signal for displaying the operating menu under instruction by the controlling part 12, and gives it to the video-output processing part 20. Details of the operating menu of the setting mode will be described in detail later.

Also, at substantially the same timing as Step S12, the controlling part 12 assigns features for the setting mode to the manipulating part 13 of the terminal 10 (Step S13). Details of the features for the setting mode will be described later. Accordingly, the terminal 10 turns to the setting mode. In this setting mode, the user operates the manipulating part 13 of the terminal 10, and can set the terminal 10 to a desired reproducing mode (Step S14).

Further, the controlling part 12 continues determination of whether the HMD 30 is in a visible condition or not (Step S15).

Then, when the HMD 30 migrates from the visible condition to an invisible condition (Step S15, NO), the controlling part 12 displays an operating menu of the audio mode on the displaying part 16 of the terminal 10 (Step S16). At this time, the signal processing part 14 generates an image signal for displaying the operating menu under instruction by the controlling part 12, and gives the signal to the displaying part 16. Details of the operating menu of the audio mode will be described later.

Also, at substantially the same timing as Step S16, the controlling part 12 assigns features for the audio mode to the manipulating part 13 of the terminal 10 (Step S17). Details of the features for the audio mode will be described later. Accordingly, the terminal 10 turns to the audio mode. In this audio mode, the user can manipulate the manipulating part 13 of the terminal 10 to reproduce an audio content (Step S18).

Further, the controlling part 12 continues determination of whether the HMD 30 is in a visible condition or not (Step S19).

Then, when the HMD 30 migrates from the invisible condition to a visible condition (Step S19, YES), the controlling part 12 returns to Step S12, and makes the terminal 10 migrate to the setting mode.

Note that for saving power consumption, the controlling part 12 stops supplying of power to the displaying part 16 of the terminal 10 during a period in which the HMD 30 is in a visible condition (period in which the determinations in Steps S11, S15, S19 are YES). A stop operation of the power supply and so on are as explained in the first embodiment.

Also, for saving power consumption, the controlling part 12 stops supplying of power to the displaying device 32 of the HMD 30 during a period in which the HMD 30 is in an invisible condition (period in which determinations in the Steps S11, S15, S19 are NO). An operation to stop supplying of power and so on are as explained in the first embodiment.

Next, operations of this embodiment when the HMD 30 migrates to a visible condition will be explained as operations seen from the user side.

FIG. 5 is a view showing an overview of when the HMD 30 is in a visible condition. Shown on the left side of FIG. 5 is a front view of the terminal 10, and shown on the right side of FIG. 5 is a displaying screen 32A displayed on the displaying device 32 of the HMD 30. On a front face of the terminal 10, together with the displaying part 16, an enter key 13a, an up key 13b, a down key 13c, a left key 13d, a right key 13e are disposed as the manipulating part 13.

FIG. 5(a) is an overview just after the HMD 30 migrates from an invisible condition to a visible condition.

At this time, the terminal 10 turns to the setting mode, and hence the operating menu $I_{mode}$ for the setting mode is displayed on the displaying screen 32A of the HMD 30. Also, for power saving, the displaying part 16 of the terminal 10 is turned off. In the operating menu $I_{mode}$, items of various types of reproducing modes, namely an item of movie mode, an item of audio mode, an item of photo mode are aligned and disposed. Here, the direction of disposition is a vertical direction seen from the user. Also, on the operating menu $I_{mode}$, a cursor Ic (cursor in a frame shape) which indicates one of the items is also disposed.

In this setting mode, to the up key 13b and the down key 13c of the terminal 10, a feature (scrolling feature) to change the object indicated by the cursor Ic on the operating menu $I_{mode}$ is assigned. Also, to the enter key 13a of the terminal 10, a feature to set the terminal 10 to the reproducing mode which is indicated by the cursor Ic is assigned. Such features of the manipulating part 13 are the features for the setting mode.

Therefore, as shown in FIG. 5(a) for example, if the user presses the enter key 13a when the object indicated by the cursor Ic is the item of the movie mode, the terminal 10 migrates to the movie mode.

FIG. 5(b) shows an overview just after migrating to the movie mode.

At this time, on the displaying screen 32A of the HMD 30, the operating menu $I_{movie}$ for the movie mode is displayed, and the displaying part 16 of the terminal 10 remains off. In the operating menu $I_{movie}$, items of titles (title 1, title 2, title 3, . . . ) of video contents with audio stored in the memory part 15 are aligned and disposed. Here, the direction of disposition is a vertical direction seen from the user. Also, on the operating menu $I_{movie}$, the cursor Ic which indicates one of the titles is disposed.

At this time, to the up key 13b and the down key 13c of the terminal 10, a feature to move the cursor Ic vertically is assigned. Also, to the right key 13e of the terminal 10, a feature to start reproduction of the title indicated by the cursor Ic is assigned.

Therefore, as shown in FIG. 5(b) for example, if the user presses the right key 13e when the object indicated by the cursor Ic is title 1, a video content with audio corresponding to the title 1 is read from the memory part 15, and reproduction thereof is started (a method for reproduction is as already explained in the first embodiment). FIG. 5(c) shows an overview of when reproduction of the title 1 is started.

Next, operations of this embodiment when the HMD 30 migrates to an invisible condition will be explained as operations seen from the user side.

FIG. 6 is a view showing an overview of when the HMD 30 is in an invisible condition.

FIG. 6(a) is an overview just after the HMD 30 migrates from a visible condition to an invisible condition.

At this time, the terminal 10 turns to the audio mode, and hence the operating menu $I_{audio}$ for the audio mode is displayed on the displaying part 16 of the terminal 10. Also, for power saving, the displaying screen 32A of the HMD 30 is turned off. In the operating menu $I_{audio}$, items of respective titles (title 7, title 8, . . . ) of audio contents stored in the memory part 15 are aligned and disposed. Here, the direction of disposition is a vertical direction seen from the user. Also, on the operating menu $I_{audio}$, a cursor Ic which indicates one of the titles is also disposed.

At this time, to the up key 13b and the down key 13c of the terminal 10, a feature (scrolling feature) to change the object indicated by the cursor Ic on the operating menu $I_{audio}$ is assigned. Also, to the right key 13e of the terminal 10, a feature to start reproduction of the title indicated by the cursor Ic is assigned. Also, a feature of rewinding the title is assigned to the left key 13d of the terminal 10. Such features of the manipulating part 13 are features for the audio mode.

Therefore, as shown in FIG. 6(a) for example, if the user presses the right key 13e when the object indicated by the cursor Ic is title 7, an audio content corresponding to the title 7 is read from the memory part 15, and reproduction thereof is started (a method for reproduction is as already explained in the first embodiment). FIG. 6(b) shows an overview of when reproduction of the title 7 is started.

As above, the terminal 10 of this embodiment migrates to the setting mode when the HMD 30 migrates from an invisible condition to a visible condition, but when the HMD 30 migrates from a visible condition to an invisible condition inversely, the terminal 10 skips the setting mode and migrates to the audio mode automatically and restricts the features of the manipulating part 13 to only the features regarding reproduction of an audio content. Accordingly, features regarding reproduction of a content including an image, namely, features regarding reproduction of an image content with audio and an image content are eliminated.

Here, a situation is assumed in which the user is wearing the HMD 30 on his/her head while he/she is in a train, a bus or the like and watching a video content with audio. At this time, the HMD 30 is in a visible condition, and the terminal 10 is set to the movie mode. When this user gets off the train, it often happens that the user retracts the display arm 64 of the HMD 30 at that timing. This is because viewing an image while walking is dangerous. At this time, the terminal 10 of this embodiment migrates to the audio mode automatically. Therefore, the user can start immediately reproduction of an audio content just by performing a simple manipulation.

Note that in this embodiment, when the terminal 10 migrates to the audio mode automatically, it is necessary to notify the user that the current mode is the audio mode. For this purpose, it is desirable that the controlling part 12 displays mode information on the displaying part 16 at least when migrated to the audio mode automatically (refer to FIG.

6(*a*)). In FIG. 6(*a*), the mode information is character information "audio". Also, migration to the audio mode may be notified by audio.

Also, it is desirable that the controlling part 12 of this embodiment creates at least a reproduction history of an audio content, and when the terminal 10 migrates to the audio mode automatically, the controlling part 12 operates based on the reproduction history.

For example, the controlling part 12 sets the object indicated by the cursor Ic to a title reproduced recently (in the nearest past) in the operating menu audio shown in FIG. 6(*a*). Thus, when the terminal 10 migrates to the audio mode automatically, the user can just press the right key 13*e* to reproduce the recently reproduced title immediately.

Also, for example, in the operating menu $I_{audio}$ shown in FIG. 6(*a*), the controlling part 12 may set the object indicated by the cursor Ic to a title with the largest number of times of reproduction. Alternatively, it may be set to a randomly selected title. Alternatively, it may be set to a randomly selected title weighted by the number of times of reproduction.

Also, for example, in the operating menu $I_{audio}$ shown in FIG. 6(*a*), the controlling part 12 may set the object indicated by the cursor Ic to a title reproduced at the same time zone in a recent date. Such a function of the terminal 10 is useful in the case where the user have a regular activity at a regular time zone everyday (for example, when commuting on a train or a bus).

Note that in this embodiment, regarding a function of the terminal 10 to automatically migrate to the audio mode (automatic migration function), it is desirable that the user is able to set in advance whether to enable the function or not. This is because even when the display arm 64 is retracted while watching a video content with audio, there may also be a user who desires to enjoy only the audio of the content.

Also, the terminal 10 of this embodiment performs the automatic migration of mode according to whether the HMD 30 is in a visible condition or not, but the automatic migration may be performed according to whether the HMD 30 is in an audible condition or not.

Note that in the structure shown in FIG. 3, whether the HMD 30 is in an audible condition or not is acknowledged by the HMD controlling part 35 from manipulation contents (manipulation contents regarding the volume) of the manipulating part 34 of the HMD 30. The HMD 30 generates a signal (status signal) indicating whether the HMD 30 is in an audible condition or not, and transmits the signal to the controlling part 12 of the terminal 10 at a predetermined frequency. The controlling part 12 receives the status signal and monitors whether the HMD 30 is in an audible condition or not.

When the HMD 30 performs the automatic migration of mode only according to whether the HMD 30 is in an audible condition or not, the controlling part 12 may operate as follows.

When the HMD 30 migrates to an audible condition→the controlling part 12 migrates to the setting mode.

When the HMD 30 migrates to an inaudible condition→the controlling part 12 migrates to the photo mode.

Also, when the HMD 30 performs automatic migration of mode according to both of whether the HMD 30 is in a visible condition or not and whether it is in an audible condition or not, the controlling part 12 may operate as follows.

When the HMD 30 migrates to a visible condition and an audible condition→the controlling part 12 migrates to the setting mode.

When the HMD 30 migrates to a visible condition and an inaudible condition→the controlling part 12 migrates to the photo mode.

When the HMD 30 migrates to an invisible condition and an audible condition→the controlling part 12 migrates to the audio mode.

When the HMD 30 migrates to an invisible condition and an inaudible condition→the controlling part 12 migrates to the storing mode.

Note that although this embodiment is a modification example of the first embodiment, the second embodiment may be modified similarly.

Fourth Embodiment

Hereinafter, a fourth embodiment of the present invention will be explained in detail based on the drawings. Here, main differences from the third embodiment will be explained. The main differences reside in operations of the controlling part 12, in particular, operations of the controlling part 12 when a video content with audio is reproduced.

FIG. 7 is an operation flowchart during the movie mode of the controlling part 12 of this embodiment.

As shown in FIG. 7, in the movie mode, when the controlling part 12 acknowledges that a reproduction assignment is inputted according to manipulation contents of the controlling part 13 (Step S21, YES), the controlling part 12 instructs the signal processing part 14 to start reproduction of a video content with audio stored in the memory part 15 (Step S22).

During this reproduction, the controlling part 12 monitors whether the HMD 30 is in a visible condition or not (Step S23), and as long as it is in a visible condition (Step S23, YES), the controlling part 12 continues the reproduction.

Thereafter, when the HMD 30 migrates from the visible condition to an invisible condition (Step S23, NO), the controlling part 12 instructs the signal processing part 14 to stop the reproduction (Step S24) and also stores the reproduction position at this time (reading position of the memory part 15) (Step S25). Note that this storing may be performed by the signal processing part 14 instead of the controlling part 12. Also, at this time, a reading operation (reproducing operation) of the memory part 15 by the signal processing part 14 is stopped, but power supply to the signal processing part 14 continues.

While the reading operation is stopped, the controlling part 12 monitors whether the HMD 30 is in a visible condition or not (Step S26), and as long as it is in the invisible condition (Step S26, NO), the controlling part 12 continues the stop state.

Thereafter, when the HMD 30 migrates from the invisible condition to a visible condition (Step S26, YES), the controlling part 12 instructs the signal processing part 14 to restart the reproduction of the video content with audio at the aforementioned stored reproduction position (Step S27), and returns to Step S23.

Therefore, when the HMD 30 migrates from a visible condition to an invisible condition during reproduction of a video content with audio, the terminal 10 of this embodiment stops the reproduction automatically. Thereafter, when the HMD 30 migrates from the invisible condition to a visible condition, the terminal 10 restarts the reproduction from the stop position automatically.

Therefore, the user of this embodiment can stop reproduction of a content just by retracting the display arm 64 while watching a video content with audio. Thereafter, the user can watch the content again from a stop position just by reeling out the display arm 64.

Also, in this embodiment, while it is stopped, since a reproducing operation in the signal processing part 14 stops, a calculation load of the circuit in the terminal 10 is reduced and also power consumption can be suppressed for some extent.

Note that during as stop period of a video content with audio (Step S23, NO; Step S26, NO), the controlling part 12 of this embodiment may display a pause screen (continually display an image that is displayed at the time of stopping). At this time, the signal processing part 14 continuously sends image information for the pause screen to the video-output processing part 20 under instruction by the controlling part 12. This image information is the same image information which is sent to the video-output processing part 20 at timing of the time of stopping.

Also, the controlling part 12 of this embodiment sets a reproduction position at the time of restarting to the same as a stored reproduction position, but it may be set to slightly before (a few seconds before) the stored reproduction position. By this setting, a possibility that the user misses a part of a video content with audio is reduced further, and it is possible to make the user recall the connection of the content when restarting.

Also, the controlling part 12 of this embodiment restarts reproduction just after the HMD 30 migrates from an invisible condition to a visible condition, but the controlling part 12 may wait just after the migration and thereafter may restart the reproduction at the time when the user inputs an assignment of restarting via the manipulating part 13.

Also, the controlling part 12 of this embodiment may stop supplying of power to the displaying device 32 of the HMD 30 only during a period in which the HMD 30 is in an invisible condition (Step S23, NO; Step S26, NO), similarly to the first embodiment. However, in this case, it is possible that the operation of the displaying device 32 does not become stable immediately after the HMD 30 migrates from the invisible condition to a visible condition (Step S26, YES), and hence the controlling part 12 may restart the reproduction after waiting for the operation of the displaying device 32 to be stable.

Also, the controlling part 12 of this embodiment stops reproduction of a video content with audio (Step S24) when the HMD 30 migrates from a visible condition to an invisible condition (Step S23, NO), but the controlling part 12 may only perform storing of a reproduction position (Step S25) while allowing the reproduction of images to continue. In this case, when the HMD 30 migrates to a visible condition (Step S26, YES), the reproduction is performed again from the stored reproduction position. In this case, the operation flowchart of the controlling part 12 is as shown in FIG. 8. The operation flowchart in FIG. 8 corresponds to one in which Step S24 of FIG. 7 is omitted.

Note that in this embodiment, regarding a function of the terminal 10 to control a reproduction position (controlling function on reproduction position) during reproduction of a video content with audio, it is desirable that the user is able to set in advance whether to enable the function or not.

Also, the controlling function on reproduction position of this embodiment is to control a reproduction position according to whether the HMD 30 is in a visible condition or not during reproduction of a video content with audio, but also controlling functions on reproduction position as follows can be realized.

(1) Function to control a reproduction position according to whether the HMD 30 is in an audible condition or not during reproduction of a video content with audio (note that detection of whether the HMD 30 is in an audible condition or not is performed for example as explained in the third embodiment).

(2) Function to control a reproduction position according to whether the HMD 30 is in an audible condition or not during reproduction of an audio content.

Also, this embodiment is a modification example of the third embodiment, but the first embodiment or the second embodiment may be modified similarly.

Fifth Embodiment

Hereinafter, a fifth embodiment (content reproduction system) of the present invention will be explained in detail based on the drawings.

FIG. 9 is a diagram showing an electrical structure of the fifth embodiment. As shown in FIG. 9, a main characteristic of this embodiment is that a connection part 79 for connecting a second connectable device is provided in the terminal 10. A connectable device to be connected to the connection part 79 is a DVD player 80, a not-shown television tuner, a not-shown digital camera, or the like as shown in FIG. 9. Here, the case that an object to be connected is the DVD player 80 will be explained as a representative.

The DVD player 80 is connectable to the connection part 79 of the terminal 10 via a connection part 84. The DVD player 80 can reproduce various types of disks such as a compact disk storing audio contents, a compact disk storing image contents, a DVD storing video contents with audio, and the like.

The DVD player 80 is provided with a player flag 82 indicating identification information of the DVD player 80. When the DVD player 80 is connected to the connection part 79 of the terminal 10, the controlling part 12 of the terminal 10 refers to the player flag 82 via the connection part 79, and acknowledges the type of the connectable device (here the DVD player 80). Note that the connection part 79 of the terminal 10 is provided with a mechanical switch or the like, and the controlling part 12 detects presence of a connection of a connectable device or not by an output signal of the mechanical switch.

In the DVD player 80, a DVD drive part 81 to which a disk can be inserted is mounted. A controlling part 83 of the DVD player 80 identifies a disk inserted in the DVD drive part 81 and can also obtain a content list of the disk and determining whether an image is included in contents of the disk or not (note that the image mentioned here includes video as well). The controlling part 83 gives the content list of the disk and information indicating presence of an image (image presence information) to the terminal 10 via the connection part 84. The DVD drive part 81 reproduces a content stored in the disk and generates a signal of the content, and supplies the signal to the terminal 10 via the connection part 84.

The content list and the image presence information given to the terminal 10 is acknowledged by the controlling part 12, and the signal of the content given to the terminal 10 is inputted to the signal processing part 14.

Next, an operation procedure of the controlling part 12 of the terminal 10 will be explained. Note that here it is assumed that the HMD 30 is in a visible condition.

When the controlling part 12 detects that a connectable device is connected to the connection part 79, the controlling part 12 refers to the player flag 82 and acknowledges the type of the connectable device (here the DVD player 80). Then, the controlling part 12 receives the content list and the image presence information from the DVD player 80.

However, when no disk is inserted in the DVD drive part 81, these information will not be transmitted from the DVD player 80, and hence the controlling part 12 puts the terminal 10 in a standby state.

In the standby state, the controlling part 12 displays an operating menu (=content list of contents stored in the memory part 15) regarding the memory part 15. A display destination of the operating menu is the displaying device 32 of the HMD 30 or the displaying part 16 of the terminal 10. Note that a method of displaying the operating menu on the displaying device 32 and a method of displaying the operating menu on the displaying part 16 are as described above. Also, features assigned to the manipulating part 13 are features regarding reproduction of a content stored in the memory part 15.

Thereafter, when a disk is inserted in the DVD drive part 81, the controlling part 12 receives the content list and the image presence information sent from the DVD player 80 and determines whether an image is included in contents of the disk or not based on the image presence information.

When an image is included in the contents of the disk, the controlling part 12 displays an operating menu regarding a disk (=content list of contents stored in the disk) on the displaying device 32 of the HMD 30, and turns off the power of the displaying part 16 of the terminal 10. At this time, features assigned to the manipulating part 13 are features regarding reproduction of a content stored in the disk.

On the other hand, when no image is included in the contents of the disk, the controlling part 12 displays an operating menu regarding the disk (=content list of contents stored in the disk) on the displaying part 16 of the terminal 10 and stops driving of the video-output processing part 20. At this time, nothing is displayed on the displaying device 32 of the HMD 30. Also, at this time, features assigned to the manipulating part 13 are features regarding reproduction of a content stored in the disk.

As above, the terminal 10 of this embodiment changes contents of the operating menu according to a driving condition (here presence of disk insertion) of a connectable device (here the DVD player 80).

Also, the terminal 10 of this embodiment changes a display destination of the operating menu regarding the connectable device (here the DVD player 80) according to the type (here, whether an image is included or not) of a content sent from the connectable device (here the DVD player 80).

Thus, when the terminal 10 performs an operation adapted to the driving condition of the connectable device (here the DVD player 80), operability of the terminal 10 when the connectable device (here the DVD player 80) is connected improves.

Note that in this embodiment, the operation of the controlling part 12 is changed only according to the driving condition of the connectable device with an assumption that the driving condition of the HMD 30 do not change, but the operation of the controlling part 12 may be changed according to both the driving condition of the HMD 30 and the driving condition of the connectable device. However, in this case, it is desirable that, between the driving condition of the HMD 30 and the driving condition of the connectable device, the former is given priority.

Also, in this embodiment, the connectable device is the DVD player 80, but as long as a signal of a content can be supplied to the terminal 10, it may be another connectable device such as a television tuner, a digital camera, an image storager, or the like.

In the case of a digital camera, for example the terminal 10 may be allowed to operate according to ON/OFF of the power of the digital camera. The operation of the terminal 10 side at this time is as follows for example.

When the power of the digital camera is off, the controlling part 12 displays an operating menu regarding the memory part 15 (content list of contents stored in the memory part 15) on the displaying device 32 of the HMD 30 or the displaying part 16 of the terminal 10, and when the power of the digital camera is on, the controlling part 12 displays an image (through image or photographed image) supplied from the digital camera on the displaying device 32 of the HMD 30.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A content reproduction system, comprising:
a content reproduction apparatus configured to reproduce a plurality of types of contents including a video content having audio information and image information, an audio content having only audio information, and an image content having only image information;
a device connected to the content reproduction apparatus configured to output a content reproduced by the content reproduction apparatus to a user; and
a controlling unit configured to (1) limit a type of content to be reproduced by the content reproduction apparatus according to an acknowledged driving condition, (2) restrict at least a part of operations of a part related to image reproduction of the content reproduction apparatus and a part related to image display of the device when display of the image by the device is ineffective, and (3) restrict an operation of a part related to image display of the device when display of the image by the device is ineffective and restricts an operation of an information displaying part when display of the image by the device is effective;
wherein:
the content reproduction apparatus is provided with (i) an acknowledging unit configured to acknowledge, as a driving condition of the device, whether an image included in the content can be displayed effectively by the device and whether an audio included in the content can be outputted effectively by the device, and (ii) the information displaying part, which is configured to display information related to reproduction of the image.

2. A content reproduction system, comprising:
a content reproduction apparatus configured to reproduce a plurality of types of contents including a video content having audio information and image information, an audio content having only audio information, and an image content having only image information, the content reproduction apparatus having a storing unit configured to store the image content and the video content;
a device connected to the content reproduction apparatus configured to output a content reproduced by the content reproduction apparatus to a user; and
a controlling unit configured to (1) limit a type of content to be reproduced by the content reproduction apparatus according to the acknowledged driving condition, and (2) restrict at least a part of operations of a part related to image reproduction of the content reproduction apparatus and a part related to image display of the device when display of the image by the device is ineffective;

wherein:

the content reproduction apparatus is provided with an acknowledging unit configured to acknowledge, as a driving condition of the device, whether an image included in the content can be displayed effectively by the device and whether an audio included in the content can be outputted effectively by the device; and during reproduction of one of the image content and the video content, when display of the image by the device changes from effective to ineffective, the controlling unit configured to store a reproduction position at this time point, and thereafter, when display of the image by the device changes from ineffective to effective, the controlling unit is configured to reproduce one of the image content and the video content again from the stored reproduction position.

3. The content reproduction system according to claim 2, wherein the controlling unit is configured to continue reproduction of one of the image content and the video content even when display of the image by the device is ineffective.

4. A content reproduction system, comprising:

a content reproduction apparatus configured to reproduce a plurality of types of contents including a video content having audio information and image information, an audio content having only audio information, and an image content having only image information;

a device connected to the content reproduction apparatus configured to output a content reproduced by the content reproduction apparatus to a user; and a controlling unit configured to (1) limit a type of content to be reproduced by the content reproduction apparatus according to an acknowledged driving condition, (2) restrict at least a part of operations of a part related to reproduction of the audio of the content reproduction apparatus when output of the audio by the device is ineffective, and (3) restrict at least a part of operations of a part related to reproduction of the audio of the content reproduction apparatus when output of the audio by the device is ineffective;

wherein the content reproduction apparatus is provided with the acknowledging unit configured to acknowledge, as a driving condition of the device, whether an image included in the content can be displayed effectively by the device and whether an audio included in the content can be outputted effectively by the device.

5. A content reproduction system, comprising:

a content reproduction apparatus configured to reproduce a plurality of types of contents including a video content having audio information and image information, an audio content having only audio information, and an image content having only image information;

a device connected to the content reproduction apparatus configured to output a content reproduced by the content reproduction apparatus to a user;

an assignment input unit configured to input an assignment from the user; and a controlling unit configured to (i) limit a type of content to be reproduced by the content reproduction apparatus according to the acknowledged driving condition, (ii) restrict at least a part of operations of a part related to image reproduction of the content reproduction apparatus and a part related to image display of the device when display of the image by the device is ineffective, and (iii) eliminate an assignment related to reproduction of the audio from objects to be inputted by the assignment input unit when output of the audio by the device is ineffective;

wherein the content reproduction apparatus is provided with an acknowledging unit configured to acknowledge, as a driving condition of the device, whether an image included in the content can be displayed effectively by the device and whether an audio included in the content can be outputted effectively by the device.

6. The content reproduction system according to claim 5, wherein the content reproduction apparatus comprises a storing unit configured to store the image content, the video content, and the audio content; and the controlling unit is configured to eliminate an assignment related to reproduction of the audio content and the video content from the objects to be inputted by the assignment input unit when output of the audio by the device is ineffective.

* * * * *